(12) United States Patent
Larsen

(10) Patent No.: US 6,367,712 B1
(45) Date of Patent: Apr. 9, 2002

(54) BOOM STRUCTURE

(75) Inventor: Mogens Larsen, Roskilde (DK)

(73) Assignee: Hardi International A/S, Taastrup (DK)

( * ) Notice: Subject to any disclaimer, the term of this patent is extended or adjusted under 35 U.S.C. 154(b) by 0 days.

(21) Appl. No.: 09/619,291

(22) Filed: Jul. 19, 2000

(30) Foreign Application Priority Data

Jul. 19, 1999 (DK) ........................................ 1999 01037

(51) Int. Cl.$^7$ ................................................. B05B 1/20
(52) U.S. Cl. ........................ 239/159; 239/166; 239/168
(58) Field of Search ................................ 239/159, 166, 239/168, 167, 164, 172, 176, 163, 161, 160

(56) References Cited

U.S. PATENT DOCUMENTS

| | | | | |
|---|---|---|---|---|
| 2,965,304 A | * | 12/1960 | Krause | 239/159 |
| 3,447,750 A | * | 6/1969 | Weston | 239/159 |
| 3,544,009 A | * | 12/1970 | Schlueter | 239/167 |
| 4,288,034 A | * | 9/1981 | Widmer et al. | 239/168 |
| 5,884,852 A | * | 3/1999 | Balmer | 239/654 |
| 5,992,759 A | * | 11/1999 | Patterson | 239/167 |
| 6,042,020 A | * | 3/2000 | Weddle | 239/166 |
| 6,059,201 A | * | 5/2000 | Weddle | 239/164 |

FOREIGN PATENT DOCUMENTS

| | | |
|---|---|---|
| DK | 153979 B | 11/1985 |
| EP | 0 343 547 A1 | 11/1989 |
| GB | 2 151 891 A | 7/1985 |

* cited by examiner

*Primary Examiner*—Kevin Shaver
*Assistant Examiner*—Davis Hwu
(74) *Attorney, Agent, or Firm*—Altera Law Group LLC

(57) ABSTRACT

The present invention relates to a boom structure for an agricultural implement (1), wherein a pivot link connects a boom section (20) with a frame (10), and actuator means (18) being capable of generating a desired pivoting of the boom section (20) about an axis (A). The pivot link is characterized by comprising a first link part (40) which is connected with the actuator means (18), and which is pivotally secured to the frame (10) to be capable of pivoting about said pivot axis (A), a second link part (50) which is connected with the boom section (20), and which is pivotally secured to the frame (10) to be capable of pivoting about said pivot axis (A), and shock absorbing means (44, 44', 46, 46') arranged between the first link part (40) and the second link part (50), said pivot link (30) being moreover adapted, by activation of the actuator means (18), to generate said desired pivoting of the boom section (20) by pivoting about the pivoting axis (A) of the first link part (40) and the second link part (50).

9 Claims, 4 Drawing Sheets

BOOM STRUCTURE

FIELD OF THE INVENTION

The present invention relates to a boom structure for an agricultural implement.

DESCRIPTION OF RELATED ART

Conventionally, agricultural implements of this type, such as e.g. an agricultural sprayer, comprise a boom structure having mounted thereon discharge channel intended for the discharge of a desired substance in liquid or in solid form. In many cases the boom structure consists of two sections and is advanced across the field with one section protruding laterally from each side of a central frame, which is typically mounted on a tractor or a tractor-drawn trailer. The boom structure is normally constructed such that each of the two boom sections can be pivoted from a working position to a transport position. According to the length of the boom sections, they may be composed of a plurality of short subsections in the longitudinal direction.

It is well-known that during driving with such agricultural implements where the boom sections may have a length of up to e.g. 25 m, strong oscillations of the boom sections can occur, in a horizontal plane as well as in a vertical plane, and therefore various types of shock absorbing mechanisms are frequently incorporated, as is explained e.g. in European Patent Application No. 343 547.

To limit oscillations in the horizontal plane, i.e. oscillations where the outer end of the boom sections reciprocates in the travelling direction, it has previously been proposed either to connect the frame and the support via a shock absorbing device, as described in the above-mentioned European patent, or alternatively to transfer pivoting movements of one boom section to the other boom section, as is explained in British Patent Application No. 2 151 891.

All the previously known solutions, however, have been found to be inexpedient and costly. Moreover, they have been found not to be suitable for use in the situations where the agricultural implement is solely provided with one boom section arranged so as to protrude from one side of the tractor. Accordingly, there is a need for providing a simplified boom structure where the forwardly and rearwardly directed oscillations in the horizontal plane are limited effectively using relatively simple means.

SUMMARY OF THE INVENTION

When the pivot link, which connects the boom section with the central frame, comprises two link parts which are interconnected by shock absorbing means that are activated by mutual pivoting of the two link parts, e.g. in the form of a plurality of rubber blocks, it has surprisingly been found possible to provide an extremely compact pivot link structure which is easy to service, and which can moreover exhibit well-defined resilience and isolation properties. Further, in agricultural implements having two boom sections, the invention allows one boom section to the isolated from the other, it being intended to absorb the oscillations to the greatest extent possible in the pivot link between the boom section and the central frame. This structure enables the boom sections to pivot independently of each other when e.g. starting and braking the agricultural implement, and makes it possible to absorb these oscillations.

If a plurality of shock absorbing means is used, these may advantageously exhibit different characteristics and be placed such that various resilience and isolation conditions may be achieved, according to the mutual pivoting between the first link part and the second link part. For example, some of the shock absorbing means may be positioned such that they are activated only by a relatively great pivoting movement, e.g. when the boom section swings with a great amplitude. These shock absorbing means may e.g. exhibit a relatively great rigidity.

When the boom section may also be connected with the other link part so that it may pivot about a substantially horizontally extending axis, an enhanced degree of freedom is achieved in a simple manner, as regards positioning of the boom section in the use of the agricultural implement.

The invention also relates to a pivot link for an agricultural implement as stated in claim 10.

In this connection, shock absorbing means are taken to mean means which either act as a spring, a damper or as a combination thereof.

BRIEF DESCRIPTION OF THE DRAWINGS

The invention will be explained more fully below with reference to an embodiment shown in the drawing. In the drawing.

DETAILED DESCRIPTION OF THE INVENTION

Figure 1:
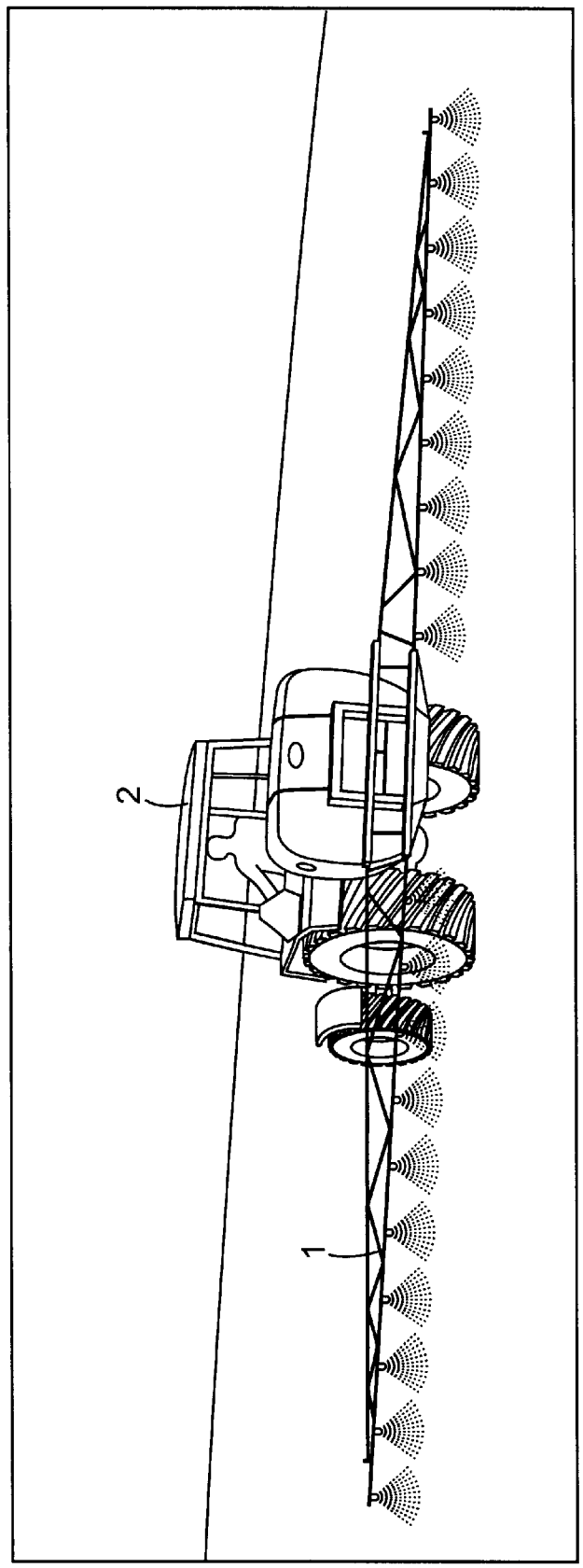
FIG. 1 shows an example of a suitable field of use for the boom structure according to the invention.

FIG. 1 shows a conventional agricultural implement in the form of an agricultural sprayer 1, which comprises an elongated boom structure and a container containing a liquid substance to be sprayed on a field. The boom structure is mounted on a support which, as shown, may be mounted on a self-propelling vehicle 2, or alternatively on a trailer.

The boom structure comprises a central frame which is mounted on the support immediately behind the shown container. A boom section extends on each side of the frame and has mounted thereon nozzles and hose connections intended for the discharge of the liquid substance. The boom sections are typically made as an elongated lattice structure which is connected with the frame via pivot links, whereby the two boom sections may be pivoted about a substantially vertical pivot axis from the shown working position to a transport position.

Figure 2:
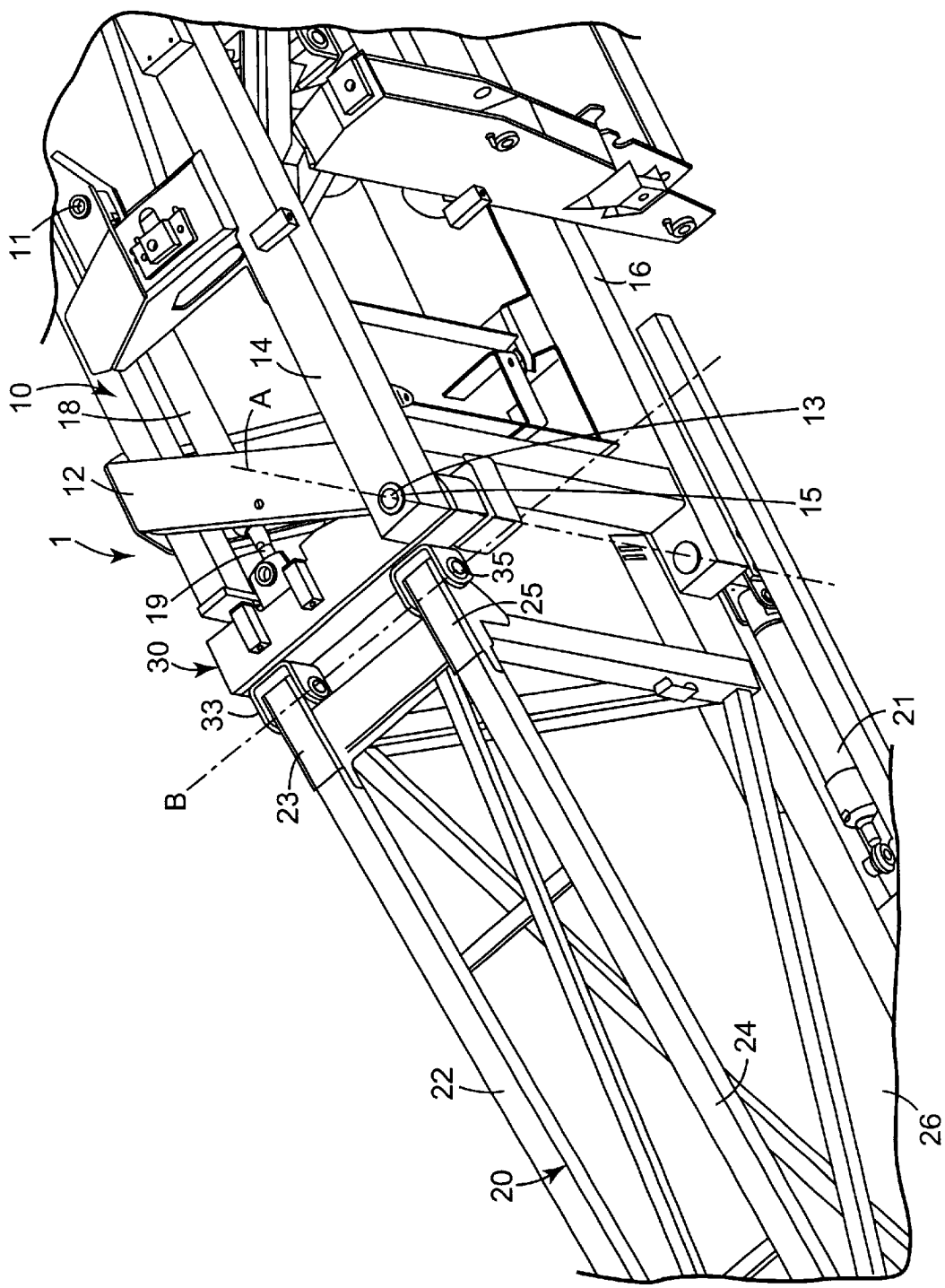
FIG. 2 is a perspective view, seen obliquely from above, of the linkage in a boom structure according to the invention between the boom section and the central frame.

FIG. 2 shows the area around the connection between the central frame 10, which is mounted on the support, and a boom section 20, there being indicated a pivot link 30 according to the present invention. The letter A indicates the vertical pivot axis about which the boom section 20 can pivot relatively to the frame 10. An actuator 18 in the form of a hydraulically driven piston is pivotally connected with the frame 10 at one end 11 and is adapted to generate a desired pivoting movement of the boom section 20 about the axis A, e.g. from the shown working position to a transport position. As will be seen, the frame 10 and the boom section 20 are preferably constructed as three-dimensional lattice structures having upper longitudinal lattice elements 12, 14, 22, 24 and lower lattice elements 16, 26. As will be described more fully below, the pivot link 30 is connected at one side with the other end 19 of the actuator 18 and at the other side with the ends 23, 25 of the upper lattice elements 22, 24 of the boom section 20. The lower lattice element 26 of the boom section 20 is pivotally supported by the frame 10 via an additional actuator 21, which can also generate a pivoting movement of the boom section 20 about a substantially horizontal axis B.

As shown from below in FIG. 3, the pivot link 30 comprises a first link part 40 and a second link part 50, both of which are adapted to pivot about the axis A. For this purpose, the two link parts 40, 50 are pivotally connected with the lattice element 14 of the frame 10 via a cylindrical pin 15 or a similar element.

The first link part 40, as shown, is preferably shaped as an elongated plate element 42 which carries a pipe section at one end to receive the pin 15, and which, at the other end, has a protruding flange 43 with which the other end 19 of the actuator is pivotally connected. The plate element 42 is made visible in the figure by cutting-away of a part of the flange 43. Further, a plurality of block-shaped resilient shock absorbing means 44, 44', 46, 46' are arranged on each side of the plate element 42. The shock absorbing means 44, 44', 46, 46' are preferably made of a rubber material or of a material exhibiting similar properties, and the means 44, 44' can exhibit another shock absorbing characteristic than the means 46, 46'. It will be seen that activation of the actuator means 18 may cause a pivoting movement of the first link part 40 about the axis A.

Figure 4:
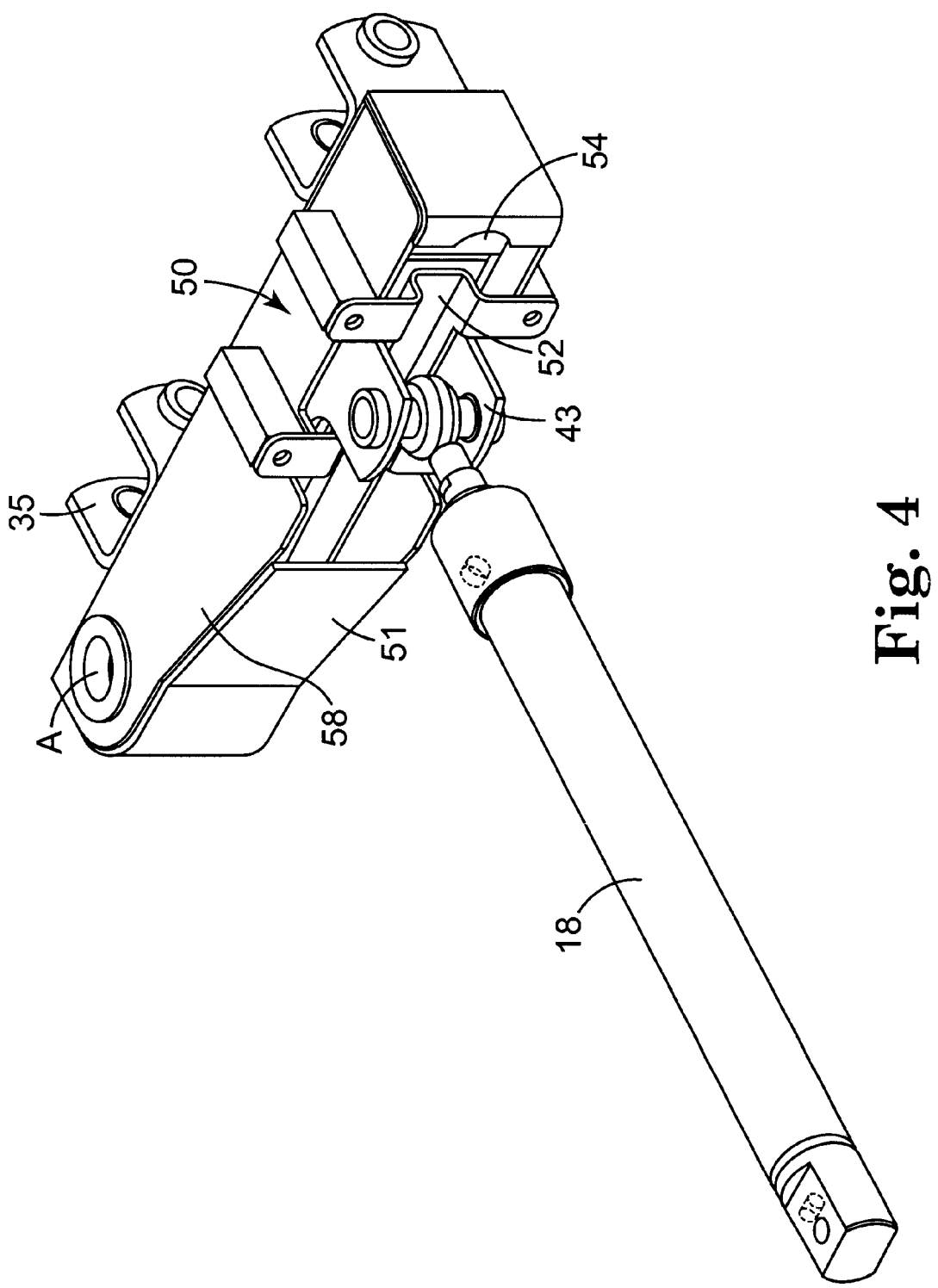
FIG. 4 shows the linkage in perspective.

The second link part 50, in the shown preferred embodiment, is formed with a substantially outwardly closed cross-section which forms an enclosure of the first link part 40. This greatly prevents the shock absorbing means 44, 44', 46, 46' from being exposed to the aggressive chemicals which frequently occur in the use of the agricultural sprayer 1. The link part 50 comprises a plate-shaped upper part 58, which is shown more clearly in FIG. 4, and which mounts an annular skirt 51 that extends down past the first link part 40. Opposite the upper part 58, the skirt 51 may have mounted thereon a further plate-shaped part that can form a complete enclosure of the first link part 40. The link part 50 also carries a pipe section intended to receive the pin 15, so that the link part 50 may pivot about the axis A.

In an area the skirt 51 is provided with an opening 54 through which the flange 43 of the first link part 40, with which the end 19 of the actuator 18 is connected, can extend out into the atmosphere. Opposite this opening 54, the skirt 51 moreover has mounted thereon brackets 33, 35 with which the ends 23, 25 of the upper lattice elements 22, 24 of the boom section 20 may be connected, as shown in FIG. 2. The brackets 33, 35 are preferably constructed such that the boom section 20 may also pivot about a substantially horizontally extending axis B, so that, if desired, the boom section 20 may be pivoted to a vertical position. The second link part 50 additionally comprises a downwardly extending abutment plate 52, which may e.g. be secured to the upper part 58 in an area at the mentioned opening 54 in the skirt 51.

In the correctly mounted state of the first link part 40 in the interior of the second link part 50, the abutment plate 52 and a part of the skirt 51 positioned oppositely to it form an abutment for the means 44, 44'. It is preferred that the means 44, 44' engage the abutments with a certain bias so that there is contact between the means 44, 44' and the abutments at any time.

Figure 3:
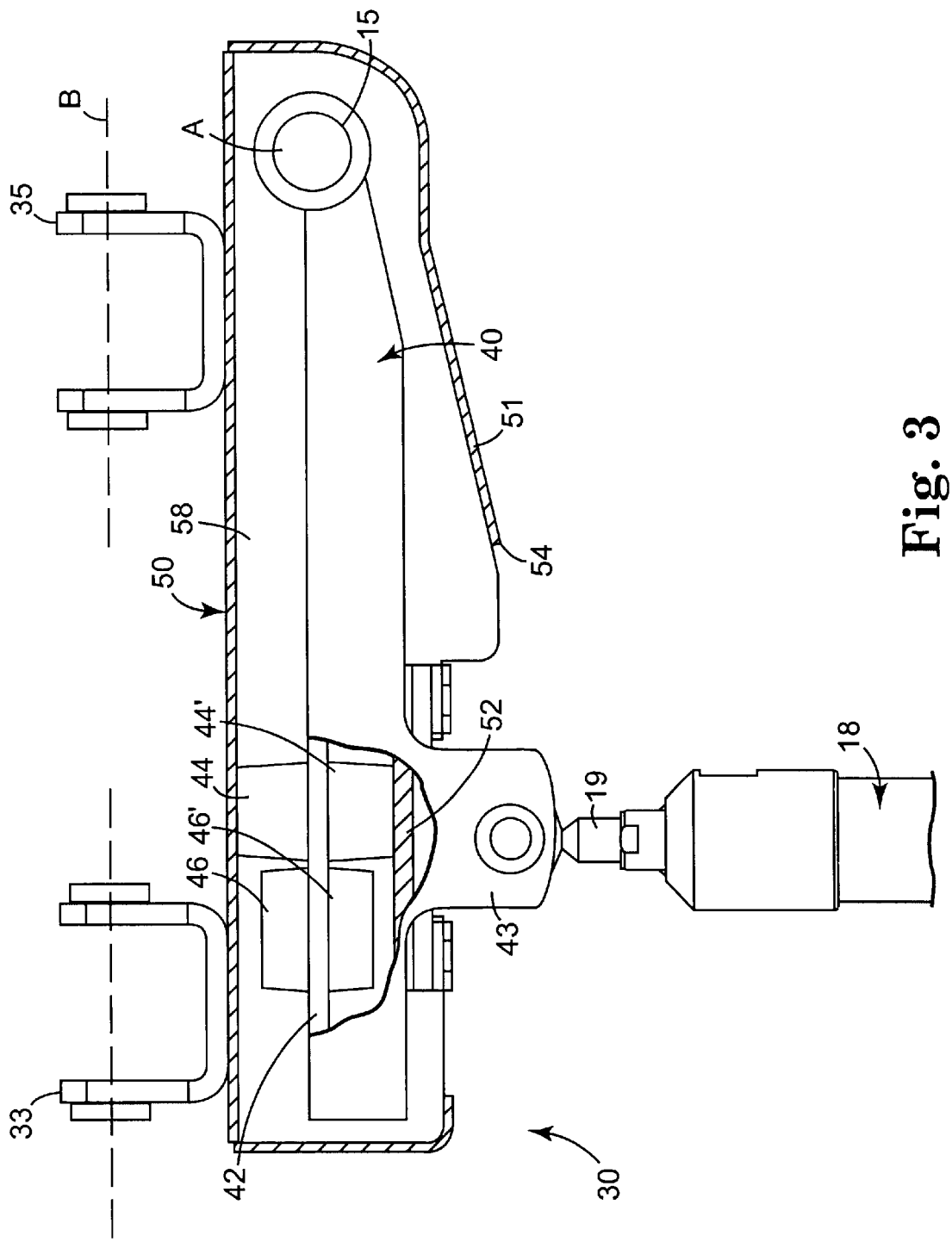
FIG. 3 shows the linkage, seen from below and in enlarged view, with parts thereof partially cut away.

The position shown in FIG. 3 of the first link part 40 relative to the second link part 50 corresponds to the state shown in FIG. 2 in which the boom section 20 extends in extension of the frame 10. The shock absorbing means 46, 46' positioned most remotely from the pin 15 do not engage the abutments in this state.

As mentioned, activation of the actuator means 18 will cause the first link part 40 to pivot about the axis A. This pivoting movement takes place relatively slowly and will generate a corresponding pivoting movement of the second link part 50, as the first link part 40 will affect the second link part 50 by a pivot force that is transferred via the shock absorbing means 44 44'. The boom section 20, which is connected with the second link part 50 via the brackets 33, 35, will hereby be caused to pivot about the axis A. The position of the means 44, 44' on each side of the plate member 42 ensures that the pivoting movement of the boom section 10 can be accomplished both when the first link part 40 pivots clockwise and anticlockwise.

Conversely, a sudden impact on the boom section 20, e.g. by powerful deceleration or acceleration of the drawing vehicle 2, can be absorbed by the shock absorbing means 44, 44', 46, 46' which permit mutual pivoting of the second link part 50 relative to the first link part 40, and which can also provide damping of the oscillations of the boom section 10 about the axis A. The first boom part 40 may thus be locked in a desired position by the actuator means 18, it being still possible to provide an expedient damping of the oscillations of the boom section 20 by the invention.

The use of shock absorbing means having different characteristics provides varying shock absorbing properties for the pivot link. In the embodiment shown, the means 46, 46' are positioned such that they are activated only by a relatively great mutual angular pivoting movement of the first and second link parts.

It will be appreciated that damping of one boom section independent of the damping of the other boom section may be achieved by connecting a respective boom section with the central frame 10 via a respective pivot link.

One end 11 of the actuator means 18 has been described above as being secured to the frame 10. It should be stressed, however, that the actuator means 18 may very well be secured to the support on the drawing vehicle 2, if such a solution is found more expedient. The frame 10 may moreover be mounted in a conventional manner so as to be pivotable about a substantially horizontal pivot axis relative to the support to allow oscillations of the boom structure in a vertical plane.

It will be appreciated that by suitable selection of the properties of the shock absorbing means a relatively slow pivoting movement of the first link part 40 may be transformed into a corresponding pivoting movement of the second link part 50, as is the case by activation of the actuator means 18 to pivot the boom section 20 between the transport position and the working position. If desired, the pivot link may additionally be provided with a locking mechanism by means of which the two link parts may be interconnected to generate a direct power transfer between the link parts 40, 50 prior to the activation of the actuator means 18. In the preferred embodiment, the pivoting movement between the link parts, however, is also transferred via the shock absorbing means when the boom section is to be pivoted to a desired position.

What is claimed is:

1. A boom structure for an agricultural implement, said boom structure being mounted on a support in order to be advanced across a field, said boom structure comprising:

a frame intended to be mounted on a support, a boom section which is connected with the frame via a pivot link which allows pivoting of said boom section with respect to said frame about a substantially vertical pivot axis, a pivot cylinder which has a first end pivotally connected with the frame or with the support, and which generates a desired pivoting of the boom section about the pivot axis, wherein the pivot comprises:

a first link part connected with a second end of the pivot cylinder, the first link part being pivotally secured to the frame to pivot about said pivot axis, a second link part connected with the boom section, said second link part being pivotally secured to the frame to pivot about said pivot axis, a boom section pivoting part for providing a pivotal movement about the pivot axis of the second link part in response to a pivotal movement about the pivot axis of the first link part caused by activation of the pivot cylinder connected thereto, to generating the desired pivoting of the boom section, and the boom section pivoting part further including a shock absorber for damping oscillations of the boom section about the axis.

2. The boom structure according to claim 1, wherein the shock absorber exhibits a first characteristic within a first range of mutual pivoting between the first link part and the second link part and a second characteristic within a second, greater range of mutual pivoting.

3. The boom structure according to claim 1, wherein the first link part comprises a substantially flat and elongated plate member, which is pivotally secured to the frame or the support at one end to be capable of pivoting about said pivot axis, and which is connected with the pivot cylinder at the other end, the first link part carries said shock absorber in a longitudinal direction on each side of the elongated plate member, said second link part forms a substantially outwardly closed enclosure for said first link part, and said second link part engages the shock absorber, wherein activation of the pivot cylinder may cause said desired pivoting of the boom section by pivoting about the pivot axis of the first link part and the second link part.

4. The boom structure according to claim 2, wherein the shock absorbing means exhibit varying properties, in the direction from the pivot axis, for determining said second characteristic.

5. The boom structure according to claim 1, wherein the shock absorber is biased.

6. The boom structure according to claim 1, wherein the boom structure comprises an additional boom section which is connected with the frame opposite the first-mentioned boom section via a second pivot link, which allows a desired pivoting of the additional boom section about a substantially vertical pivot axis, and a further pivot cylinder which is connected with the frame or the support and the additional boom section, and which generates said pivoting of the additional boom section.

7. The boom structure according to claim 1, wherein at least one of the boom sections are pivotally connected with the second link part to be capable of pivoting about a substantially horizontal pivot axis.

8. The boom structure according to claim 1, wherein the frame is capable of pivoting about a substantially horizontal pivot axis relative to the support.

9. A pivot link for a boom structure for an agricultural implement, said boom structure being mounted on a support in order to be advanced across a field, said boom structure comprising:

a frame intended to be mounted on a support, a boom section which is connected with the frame via the pivot link, said pivot link allowing pivoting of the boom section with respect to said frame about a substantially vertical pivot axis, pivot cylinder which has a first end pivotally connected with the frame or with the support, and generates said pivoting of the boom section about said pivot axis, wherein the pivot link comprises:

a first link part which is connected with a second end of the pivot cylinder, and which is pivotally secured to the frame to be capable of pivoting about said pivot axis, a second link part which is connected with the boom section, and which is pivotally secured to the frame to be capable of pivoting about said pivot axis, a shock absorber disposed between the first link part and the second link part, and the pivot link, by activation of the pivot cylinder, generates said desired pivoting of the boom section by pivoting about the pivot axis of the first link part and the second link part.

* * * * *